May 29, 1956 J. WHITE ET AL 2,748,383
ELECTROMAGNETIC DIAPHRAGM HORN
Original Filed March 11, 1949 4 Sheets-Sheet 1
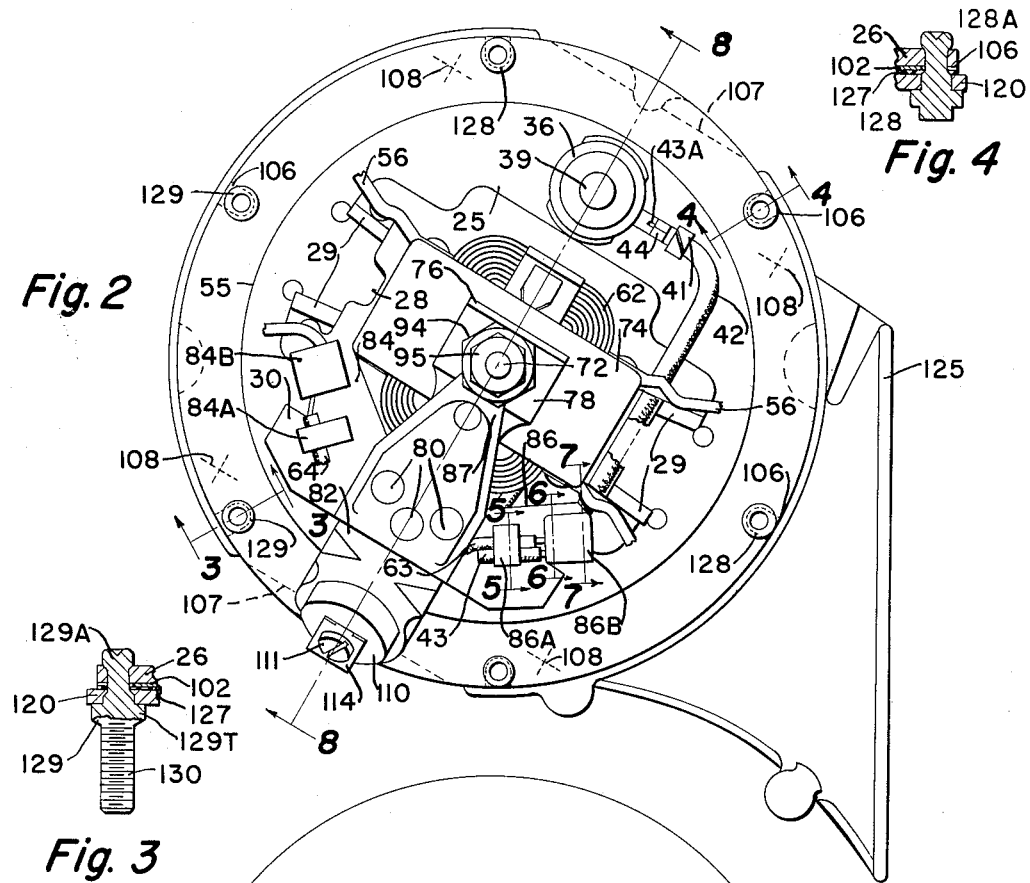
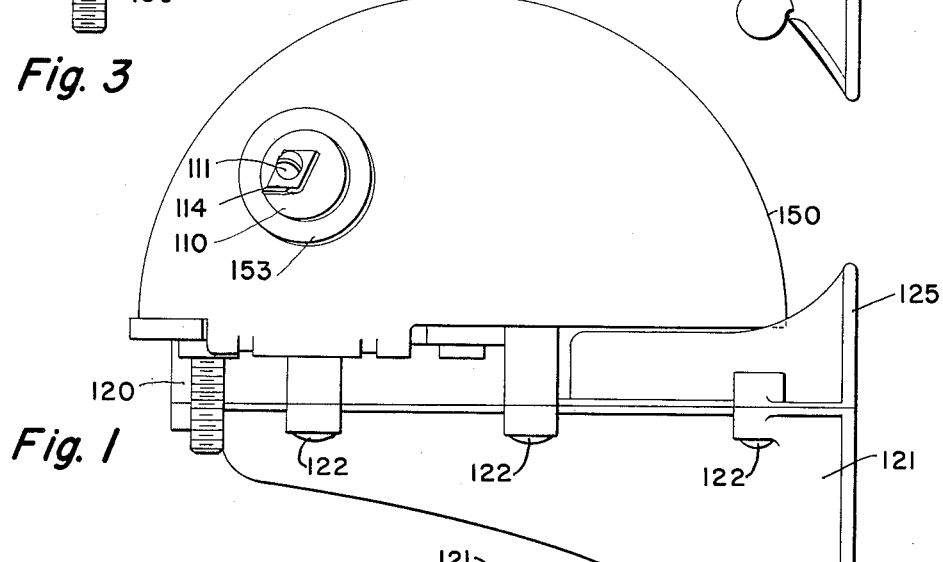
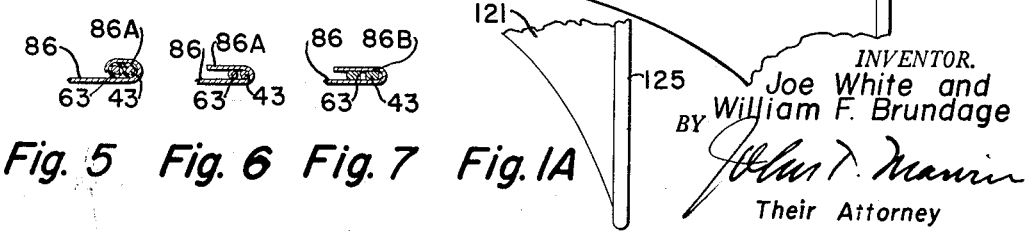
INVENTOR.
Joe White and
BY William F. Brundage
Their Attorney

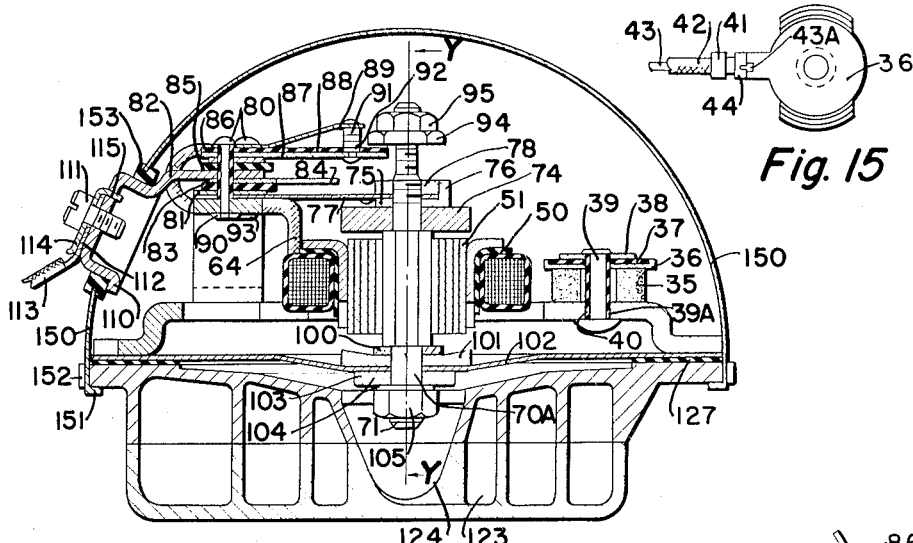
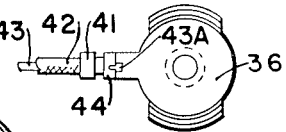
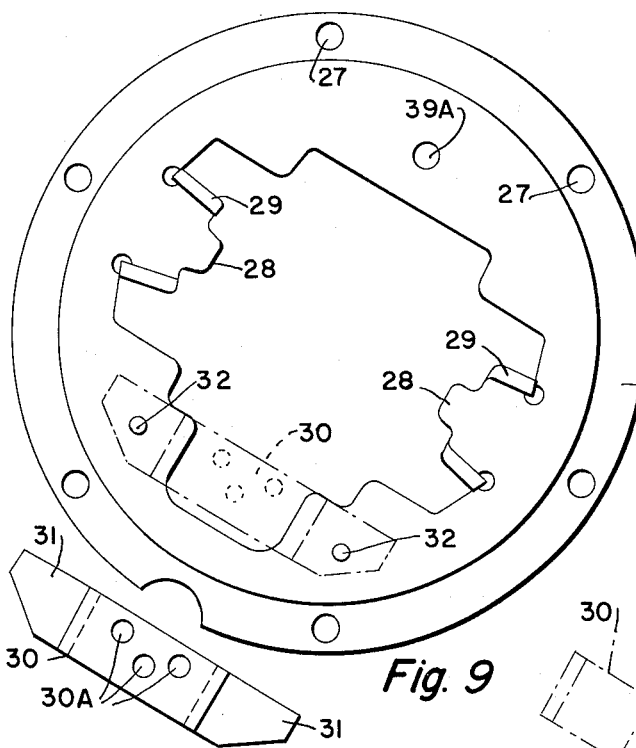
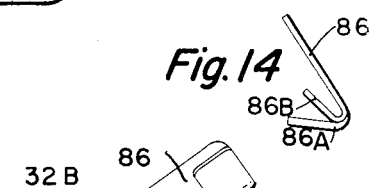
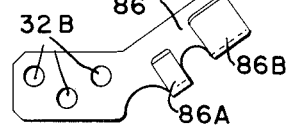
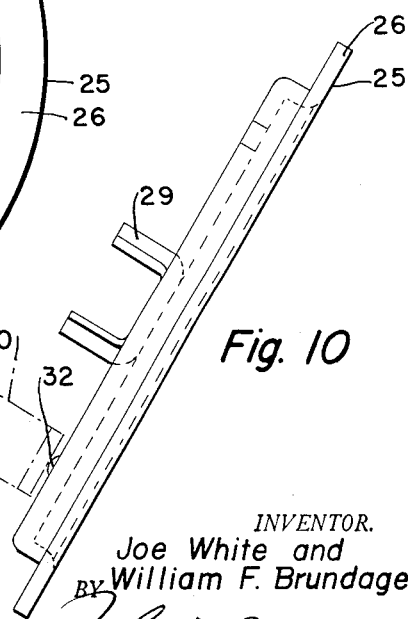
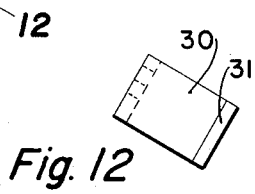

May 29, 1956 J. WHITE ET AL 2,748,383
ELECTROMAGNETIC DIAPHRAGM HORN
Original Filed March 11, 1949 4 Sheets-Sheet 3

INVENTOR.
Joe White and
BY William F. Brundage
Their Attorney

346 # United States Patent Office 2,748,383
Patented May 29, 1956

2,748,383

ELECTROMAGNETIC DIAPHRAGM HORN

Joe White and William F. Brundage, Anderson, Ind., assignors to General Motors Corporation, Detroit, Mich., a corporation of Delaware Original application March 11, 1949, Serial No. 80,854, now Patent No. 2,677,875, dated May 11, 1954. Divided and this application October 29, 1953, Serial No. 388,968

4 Claims. (Cl. 340—388)

This invention relates to a sound signal or horn having a diaphragm vibrated by an electromagnetic motor and cooperating with a projector. In this type of horn, the production of a proper tone is dependent on vibration of the diaphragm at a frequency in resonance with the natural frequency of the air in the projector. The frequency of diaphragms made according to the same specifications will vary due to variations in the diaphragm material. Since the projector frequency is non-adjustable, it is necessary to make an adjustment of diaphragm frequency so that a resonant condition will exist. Furthermore it is necessary to prevent the occurrence of conditions which would cause diaphragm frequency to change during the use of the horn. This is a division of Patent 2,677,875, issued May 11, 1954.

Accordingly, an object of the invention is to maintain stability of the diaphragm so that its frequency change is minimized. This is accomplished by permanently attaching the diaphragm at its periphery to the horn frame or base so that the diaphragm cannot creep relative to the frame and change in frequency.

Another object of the present invention is to provide a facile method of setting the air gap between the horn motor magnet poles and the motor armature. This is accomplished by fixing the location of the armature relative to the horn frame or base, placing an air gap spacer between the armature and poles of the horn motor magnet while loosely assembled with the base, exciting the coil of the magnet to cause it to be attracted toward the armature so that the spacer is clamped between the armature and magnet poles and while the coil is thus excited, in permanently attaching the horn motor magnet to the base preferably by welding its core to the base.

Another object is to simplify the manner of supporting the horn terminal member and of connecting it with the horn magnet coil.

A further object is to provide for attachment of magnet coil leads to terminals in such manner that the leads do not break when the horn is subjected to vibration.

Further objects and advantages of the present invention will be apparent from the following description, reference being had to the accompanying drawings, wherein a preferred embodiment of the present invention is clearly shown.

In the drawings:

Fig. 1 is a side elevation of the horn.

Fig. 1A is a view showing a continuation of the projector broken off from the projector shown in Fig. 1.

Fig. 2 is a plan view of the horn shown in Fig. 1 with the cover removed.

Figs. 3 and 4 are sectional views taken on lines 3—3 and 4—4 respectively of Fig. 2.

Figs. 5, 6 and 7 are sectional views taken on lines 5—5, 6—6 and 7—7 respectively of Fig. 2.

Fig. 8 is a sectional view taken on line 8—8 of Fig. 2 with the cover added.

Fig. 9 is a plan view of the horn base.

Fig. 10 is a side view of the base looking in the direction of the arrow 10 in Fig. 9.

Fig. 11 is a plan view of a bracket to be welded to the base as shown in dot and dash lines in Fig. 9.

Fig. 12 is a side view of the bracket shown in Fig. 11 and looking in the direction of arrow 12 in Fig. 11.

Fig. 13 is a detail plan view of one of the terminals shown in Figs. 2 and 8.

Fig. 14 is an end view of the terminal looking in the direction of arrow 14 in Fig. 13.

Fig. 15 is a detailed view of a terminal clip showing a lead attached thereto.

Figure 16:
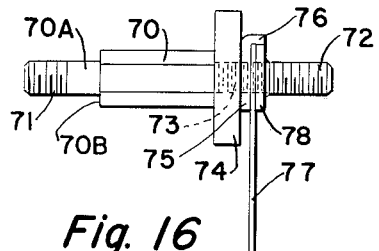

Fig. 16 is a side view of the armature assembly for the electromagnet motor.

Figure 17:
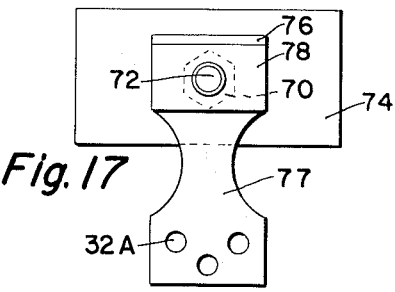

Fig. 17 is a plan view of the armature assembly shown in Fig. 16.

Figure 18:
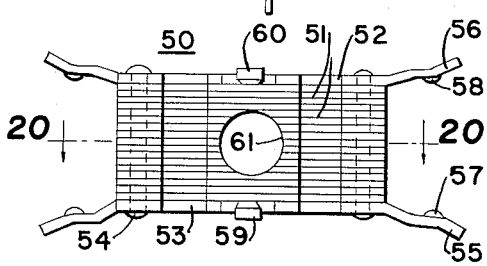

Fig. 18 is a plan view of the core or field frame for the electromagnet motor.

Figure 19:
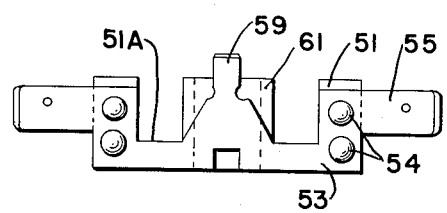

Fig. 19 is an end view of the field frame looking in the direction of arrow 19 of Fig. 18.

Figure 20:
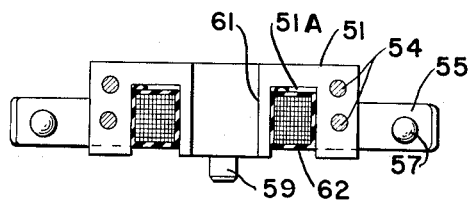

Fig. 20 is a sectional view taken on line 20—20 of Fig. 18, showing a section of the winding in place.

Figure 21:
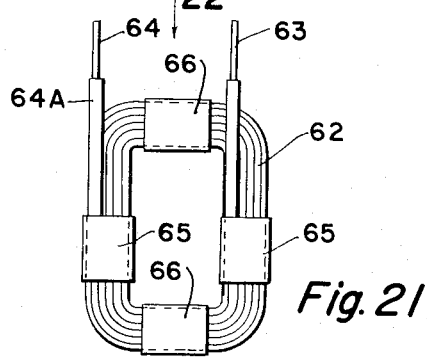

Fig. 21 is a plan view of the winding shown in Fig. 20.

Figure 22:
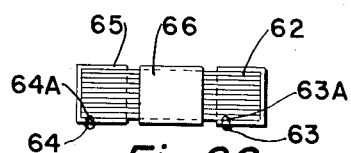

Fig. 22 is an end view of the coil parts looking in the direction of arrow 22 of Fig. 21.

Figure 23:
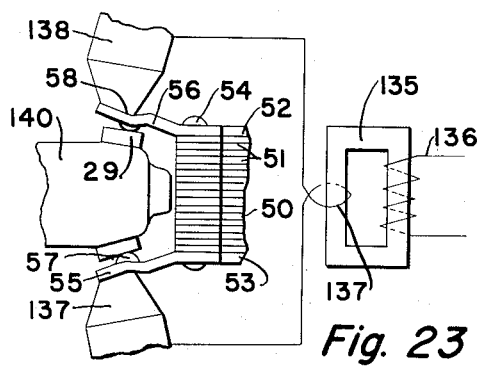

Fig. 23 is a diagrammatic view of a welding circuit for welding the core to the frame.

Figure 24:
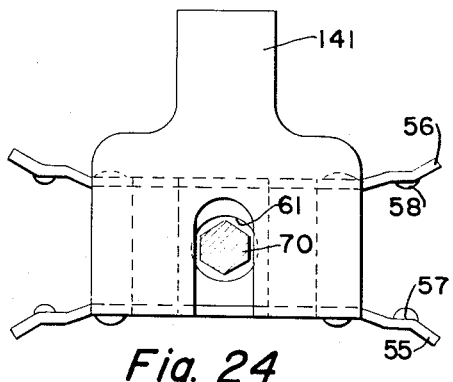

Fig. 24 is a fragmentary view showing the use of a shim to set the air gap between the armature and core.

Figure 25:
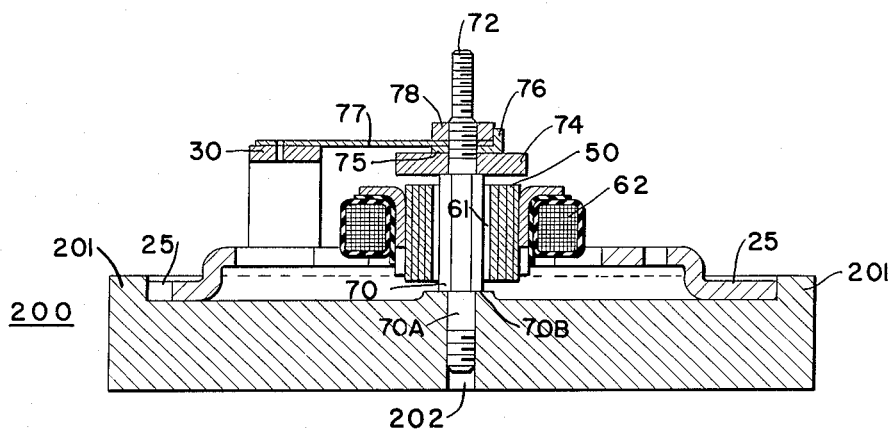

Fig. 25 is a sectional view showing a fixture for holding in the armature and base in a predetermined relation when the air gap is to be set prior to attachment of the armature to other parts.

A frame or base 25 (Figs. 8, 9 and 10) is provided with a flange 26 having holes 27 and with inwardly extending lugs 28 and upwardly extending lugs 29. A bracket or shelf 30 is attached to the base 25 by projection welding. For this purpose, the base is provided with spherical bosses or projections 32 which are engaged by the ears 31 of the shelf 30 during the welding operation.

To the base 25 there is attached a resistor assembly which comprises a disc resistor 35 (Fig. 8), a terminal clip 36, an insulating washer 37, a metal washer 38, a rivet 39 (received by hole 39a in the base 25) and a nonconducting sleeve 40 surrounding the rivet. After these parts are assembled to the base as shown in Fig. 8, the upper end of the rivet 39 is upset. The underside of resistor 35 is grounded on frame 25. The upper side of resistor 35 is electrically connected with the terminal clip 36 which has prongs 41 which are formed around the insulation 42 of a wire 43 whose end 43a is engaged by prongs 44 also integral with the clip 36. The wire end 43a is united with the prongs 44 and the clip 36 by welding.

The central opening in the base 25 receives an electromagnet assembly 50 (Fig. 8) which comprises a plurality of E-shaped laminations 51 (Fig. 19) of magnet iron, and steel plates 52 and 53 (Fig. 18) which are attached to the laminations by rivets 54. The plate 52 is provided with lugs or arms 56 provided with spherical projections 58 and with a tang 60. The plate 53 is provided with lugs or arms 55 having spherical projections 57 and with a tang 59. After the parts have been assembled, as shown in Fig. 18, a central hole 61 is drilled. A magnet coil 62 (Fig. 21) having terminal wires 63 and 64, is assembled with the laminations and plates as shown in Fig. 20. As shown the coil 62 is wound preferably in a rectangular form and the wires 63 and 64 extend along the longer sides of the coil. The wires 63 and 64 are enclosed in sleeves 63a and 64a, respectively, of insulating material. The longer sides of the windings of the coil and the sleeves are held in a compact relation by strips of tape 65 and shorter sides of the windings are held by strips 66. The steps 65 are offset with respect to the center of the longer sides of the coil so that when the coil is assembled with the core, with the sleeves adjacent the bottoms 51a provided by the laminations a large portion of the sleeves 63a and 64a will be pinched between the coil and the core, thus, anchoring the wires 63 and 64 in definite position with respect to the core. The tangs 59 and 60 are bent over as shown in Fig. 8 in order to retain the coil 62 in assembled relation with the core 50. The arms 55 and 56 are bent, when necessary, in order to locate them a certain distance apart and symmetrically with respect to the axis y—y (Fig. 8) which is parallel to the laminations and passes through the center of the hole 61. The spacing of the arms is required so that when the electromagnet is assembled on the frame the spherical projections 57 and 58 will move freely relative to the lugs 29 of the frame without any drag. It is pointed out that the space between the lugs and projections is slight so that it will only require a slight pressure to force the arms against the lugs when the former are welded or otherwise fixed to the lugs.

The armature assembly shown in Figs. 16 and 17 comprises a rod 70 having reduced threaded ends 71 and 72 and a threaded cylindrical portion 73 which receives an armature 74, a plate 75 having a flange 76, a leaf spring 77 and a nut 78. When these parts are assembled, the flange 76 of plate 75 fits around the square end of the spring 77 and the flat side of the nut 78, which threadedly engages the portion 73. The spring 77 is provided with three holes 32a which register with the three holes 30a in the shelf 30. These holes receive rivets 80 by which the leaf spring 77 and other parts shown in Fig. 8 are attached to the shelf 30.

After placing the electromagnet assembly 50 upon the base 25 with the arms 55 and 56 resting thereon, the armature assembly is assembled by passing the rod 70 (not yet assembled with parts 100 to 105 to be described) through the hole 61 in the magnet core, and the spring 77 is placed upon the shelf with the holes 32a thereof registering with the holes 30a of the shelf 30. Then a loose assembly or stack of parts including a circuit breaker is assembled. This stack of parts includes in addition to the spring 77 (Fig. 8) a metal spacer 81, an insulating plate 83, a connector plate 84, a terminal 82, an insulating plate 85, a connector plate 86, a leaf spring 87, an insulating plate 88, three rivets 80 and nonconducting tubes 90 which surround the rivets. The bracket 89 supports a contact 91 normally engaged by a contact 92 attached to the leaf spring 87 and projecting through a hole provided in the plate 88. The lower ends of the rivets 80 are swedged over at 93 in order to secure the stack of parts to the shelf 30. The heads of rivets 80 contact the bracket 89 so that contact 91 is connected to ground through bracket 89, rivets 80, shelf 30 and frame 25 which is grounded by its mounting upon the frame of the vehicle which a ground strap connects with a terminal of the storage battery. A nut 94 which is engageable with the plate 88 and a lock nut 95 are screwed on the end 72 of the rod 70.

A plain washer 100 (Fig. 8), a slightly dished washer 101, a diaphragm 102, a plain washer 103 and a lock washer 104 are assembled upon the reduced cylindrical portion 70a of the rod 70 (Fig. 16) and a nut 105 is threaded on the end 71 of the rod 70. Before the nut 105 is tightened, the diaphragm 102 is aligned with the frame 25 in such a way that notches 106 (Fig. 2) provided by the diaphragm will register with the holes 27 in the flange 26 of the frame 25 and so that flats 107 provided by the diaphragm will extend in the manner shown. Then the diaphragm is attached to the frame flange 26 permanently by spot-welding at a plurality of places designated by the crosses 108 in dotted lines in Fig. 2.

The next step is to connect the various leads with the terminal plates 84 and 86. These plates are similar in shape, one being a right-hand and the other a left-hand. Plate 86 is shown in Figs. 13 and 14. It has three holes 32b, which receive the rivets 80 and rivet insulator tubes 90, a tang 86a and a tang 86b. As shown in Fig. 2, the terminal plate 84 has tangs 84a and 84b corresponding to tangs 86a and 86b of the terminal plate 86. Coil lead wire 64 is placed within the fold of the tang 84a which is bent around the insulation of this wire. The bared end of this wire is placed within the fold of the tang 84b. The coil lead wire 63 and the resistor lead wire 43 are placed within the fold of the tang 86a which is bent around the insulation of these wires and the bared ends of these wires are placed within the fold of the tang 86b. Fig. 5 shows the manner in which the tang 86a is bent around the wires 63 and 43. Since terminal plate 86 engage leaf spring 87, contact 92 is connected to coil lead 63 and the lead 43 of the resistor 35 which is grounded. Therefore normally closed contacts 91 and 92 short-circuit the resistor 35. When contact 91 separates from contact 92, resistor 35 becomes effective to reduce arcing at the contacts.

In a similar manner the tang 84a is bent around the wire 64. The tang 84b is squeezed around the bared ends of the wire 64 and welding current is applied thereby making a permanent electrical connection between the wire 64 and the plate 84. Also the bared ends of the wires 63 and 43 are squeezed between the plate 86 and its tang 86b and welding current is applied to make a permanent electrical connection between these wires and the plate 86. The shape of the welding electrode applied to the tank 86b is such that at section 7—7 of Fig. 2, the wires will be completely smashed down as shown in Fig. 7, while at section 6—6, the wires are still substantially round but are joined to the plate and the tang by welding. Between sections 6—6 and 7—7 of Fig. 2, the wires taper in cross section from round to very flat. The reason for this construction is to secure a good anchorage by gradually flattening the wires between section 6—6 and section 7—7 whereas in section 6—6 at the left thereof, the wires are left substantially round so that they will have sufficient strength to resist vibration and not break off. The manner of welding the wire 64 between the plate 84 and its tang 84b is the same as shown in Figs. 6 and 7.

Leads 63 and 64 brought out from the underside of coil 62 (Fig. 8) having loops of substantial radius which connect with the clips 86 and 84 respectively. Therefore these leads offer substantially no resistance to relative motion between the core 50 and the armature 74 when, just before welding the core parts 55 and 56 to the frame parts 29, electric current is passed to the coil 62. Vibration of the loops of the coil leads 63 and 64 incidental to use of the horn on an automobile does not result in breakage of the leads since they have been connected to their terminals in the manner described with reference to Figs. 5, 6, 7, 13 and 14 and they have been clamped between the coil 62 and the core 51 as shown in Fig. 20.

The terminal 82, which is in electrical engagement with the connector plate 84 has its free end bent downwardly; and said end is to provide a cup-shaped member 110. The member 110, receives a screw 111 for attaching thereto a clip 112 attached to end of a wire 113 and a clamp 114 having a tang 115 received by a hole in the member 110 whereby rotation of the clamp 114 is prevented and it serves to prevent accidental rotation of the screw 111 by frictional engagement with its head.

The projector assembly comprises an upper shell 120 and a lower shell 121 which are secured together by rivets 122 integral with the upper shell. The upper and lower shells provide the spiral sound passage or column 123 (Fig. 8) which starts at the diaphragm chamber 124 and ends with the shell or trumpet end 125 (Fig. 1). The projector assembly together with a gasket 127 are attached to the base flange 26 by six rivets, four of which are shown in Fig. 2 and are attached to the base flange 26 by six rivets, four of which are shown in Fig. 2 and are designated by numeral 128. The two remaining rivets are designated by numeral 129 and are each provided with a threaded portion 130 (Fig. 3) and they serve to attach the horn to a mounting bracket, not shown. The arrangement of the six rivets can be varied from that shown in Fig. 2 in order to locate rivets 129 in the required position. By reference to Figs. 4 and 3 it will be seen that the rivets 128 and 129 have bulbous upset portions 128a and 129a which hold tighter than conventional rivets, bulbous upsetting of rivets is well known in the art. Rivet 129 has radial teeth 129t which bite into the softer metal of the projector member 120 thereby resisting the turning of rivet 129 when a wrench is applied to tighten a nut thereon used to attach the horn to a mounting bracket.

The final step in the making of the horn is the welding of the arms 55 and 56 of the horn magnet to the lugs 29 of the frame 25. Before welding, the armature 74 and the pole faces of the electromagnet are located a definite distance apart. A metal shim 141 (Fig. 24) of predetermined thickness, and preferably magnetizable, is placed between the armature 74 and the pole faces of the magnet core and electric current is caused to pass through the coil 62, thereby causing the magnet core to move toward the armature and bear firmly against the shim 141, care being taken to insure that substantially all the movement is confined to the magnet core and that movement of the armature is inconsequential. By having the magnet assembly loosely assembled with the frame and by providing freedom of movement of the magnet assembly through the use of substantial loops in its coil leads 63 and 64 the magnet assembly is caused to move into a definite position relative to the frame and provide the correct air gap. It is pointed out that since the armature is connected with the diaphragm and should there be any drag between the arms 55 and 56 and the lugs 29, when the coil is energized, the force to the armature will be such as to cause a movement of the diaphragm which, in turn will produce an error in the final air gap after the welding operation is completed. Thus by having the magnet assembly free, substantially all movement is imparted to the magnet assembly and the air gap that results is substantially the correct one. The lugs 28 of the frame which are spaced about one thirty-second of an inch from the ends of the core serve to locate the core approximately centrally of the frame.

The welding circuit is shown diagrammatically in Fig. 23 in which numeral 135 designates a welding transformer having a primary coil 136 and a secondary coil 137 whose leads are connected with welding electrodes 138 and 139. A part of the welding circuit is provided by a copper wedge 140 which is forced between a pair of lugs 29 while the electrodes 138 and 139 are forced against the arms 56 and 55. While pressure is thus applied, the welding current is turned on and the arms are united by projection welding by virtue of the spherical projections 57 and 58 which melt down as the electrodes force the arms 56 and 55 against the lugs 29. Fig. 2 these arms are designated by their numerals without the affix, and the numerals 55′ and 56′ and 29′ designate the status of these parts after welding. After the welding operation which comprises the cycle of squeeze time, weld time and hold time, the electromagnet assembly is permanently assembled with the frame.

After the welding operation, the nut 94 is adjusted along the rod 70 in order to adjust the amount of separation of the contact 92 from the contact 91 when the horn magnet coil is energized. This adjustment is made for the purpose of obtaining a certain current flow through the horn magnet coil before contact separation, thereby determining the amount of electrical energy produced by the electromagnet and consequently the volume of the sound of the horn. For this purpose the nut 94 is adjusted so that normally there is a predetermined clearance (.010″ for example) between it and the non-conducting plate 88 (Fig. 8).

After assembly, the frequency of the diaphragm can be lowered into resonance with the projector, when required, by reducing the stiffness of the diaphragm. This is effected by deflecting the diaphragm upwardly beyond its elastic limit by a pull applied axially of the rod 70. Since raising the diaphragm frequency is not provided for, the frequencies of the diaphragms which are used should be resonant frequency or slightly higher. Since the diaphragm is welded to the frame it will not creep relative to the frame and its frequency will not change appreciably in use. Obviously when the diaphragm is deflected for the purpose of reducing its frequency, its periphery does not creep relative to the frame; and, when the deflecting force exerted upon the rod 70 is removed, there is no change in relationship between the peripheral portion of the diaphragm and the frame.

The horn is now complete except for the addition of the back shell 150 which has tangs 151 which are bent into notches 152 (Fig. 8) provided by the projector upper shell 120. The shell is provided with an opening lined with a rubberlike grommet 153 through which projects the cupped part 110 of the terminal 82.

The method of setting the air gap between the armature 74 and the poles 51 of core 50 requires maintaining a predetermined relation between the armature and the base 25. In the assembly procedure stated heretofore, the armature is assembled with the spring 77 which is assembled with the base shelf 30; and the armature is assembled with the diaphragm which is welded to the base. This fixes the relation of the armature to the base prior to setting the air gap. It is possible to fix the relation of the armature and the base prior to setting the air gap without attaching the armature to the diaphragm. This relation can be established by a fixture plate 200 (Fig. 25) having an annular boss 201 which locates the base 25 centrally with respect to a hole 202 in the plate. An armature subassembly can be made including the armature 74 and the rod 70. After placing the magnet core and coil assembly upon the base 25 with the core located between lugs 28 and the lugs 55 and 56 of the core straddling the lugs 29 of the base, the rod 70 is passed through the hole 61 in the core and the reduced end 70a of the rod is passed into a hole 202 in the plate 200, the shoulder 70b of the rod 70 resting upon a boss 203 which supports the armature 74 in a location relative to the base 25 which is the same as it has in the previously described procedure just prior to setting the air gap. The spacer 141 (Fig. 24) is placed between the armature 74 and the core 50 and the magnet coil 62 is excited so that the armature, spacer and core are held in contact by magnetic attraction. The weight of the rod and the armature, air gap spacer and core and coil assembly supported thereby retains the rod shoulder 70b upon the boss 203. Therefore the core 50 is maintained in correct relation to the base 25 for the welding operation.

While the embodiment of the present invention as herein disclosed, constitutes a preferred form, it is to be understood that other forms might be adopted.

What is claimed is as follows:

1. A horn assembly comprising a frame having a central opening therein, at least four upstanding lugs spaced on the periphery of said opening integrally formed on said frame, a sound projector secured to said frame, a diaphragm interposed between said frame and projector, an electromagnetic motor for vibrating said diaphragm, said motor including; a T-shaped armature assembly having the leg of the T secured to and supported by said diaphragm, a coil winding assembly having an E-shaped laminated pole assembly with a coil winding disposed between the arms of said E-shaped pole and at least four lugs extending from said pole assembly and disposed for being attached to the lugs of said frame for maintaining said pole assembly in a predetermined spaced relation to the arms of the T of the armature and within the opening of said frame.

2. In a horn assembly having a sound projector, a base and diaphragm constructed to be laminated on said projector and secured thereto, a plurality of lugs spaced around the periphery of an opening in said base, an armature for an electromagnetic motor carried by said diaphragm, an electromagnetic coil assembly for said electromagnetic motor having a laminated pole assembly spaced from said armature, by an air gap of predetermined thickness, and a plurality of lugs on said laminated pole assembly extending for attachment with the lugs on the base for maintaining the thickness of said air gap.

3. In a horn assembly, the combination comprising; a frame having a central opening and at least four lugs spaced on the periphery of said opening, a diaphragm secured to said base, and an electromagnetic motor for vibrating said diaphragm, said motor including; a T-shaped armature assembly having the leg of the T secured to and supported by said diaphragm, a coil winding assembly having an E-shaped laminated pole assembly with a coil winding disposed between the arms of said E-shaped pole and at least four lugs extending from said pole assembly and disposed for being attached to the lugs of said frame for maintaining said pole assembly in a predetermined spaced relation to the arms of the T of the armature and within the opening of said frame.

4. In a horn assembly having a sound projector, a base and a diaphragm constructed to be laminated between said base and projector, a plurality of extending lugs integrally formed with and spaced about an opening in said base, an electromagnetic T-shaped armature secured by the leg portion thereof to said diaphragm, an electromagnetic coil winding assembly constructed to be received within the opening in said base and having an E-shaped laminated pole having the ends of the arm portions spaced from the arms of said T-shaped armature by an air gap of predetermined thickness, a coil winding surrounding the intermediate arm and disposed between the outer arms of said E-shaped laminated pole assembly, and a plurality of lugs on said laminated pole assembly extending for attachment with the lugs on the base for maintaining the thickness of said air gap when the lugs on the pole assembly are secured to the lugs on the base.

References Cited in the file of this patent

UNITED STATES PATENTS

| | | |
|---|---|---|
| 1,759,443 | Dorsey | May 20, 1930 |
| 1,954,341 | Apple | Apr. 10, 1934 |
| 2,048,984 | Zeininger | July 28, 1936 |
| 2,094,772 | Critchfield | Oct. 5, 1937 |
| 2,155,366 | Scofield | Apr. 18, 1939 |
| 2,213,493 | Gilinson | Sept. 3, 1940 |
| 2,560,678 | Wirt | July 17, 1951 |